R. H. RICE.
BEARING AND OILING MEANS THEREFOR.
APPLICATION FILED AUG. 13, 1917.

1,313,736.

Patented Aug. 19, 1919.

Inventor,
Richard H. Rice,
by Albert G. Davis
Att'y.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

BEARING AND OILING MEANS THEREFOR.

1,313,736.     Specification of Letters Patent.     Patented Aug. 19, 1919.

Application filed August 13, 1917. Serial No. 185,864.

*To all whom it may concern:*

Be it known that I, RICHARD H. RICE, a citizen of the United States, residing at Swampscott, in the county of Essex, State of Massachusetts, have invented certain new and useful Improvements in Bearings and Oiling Means Therefor, of which the following is a specification.

The present invention relates to bearings and particularly ball bearings which are arranged to be lubricated by means of oil rings.

The object of the invention is to provide an improved bearing structure which is simple to build, easy to assemble and dismantle, and which will insure ample lubrication of the bearing surfaces.

For a consideration of what I believe to be novel and my invention, attention is directed to the accompanying specification and the claims appended thereto.

Figure 1:
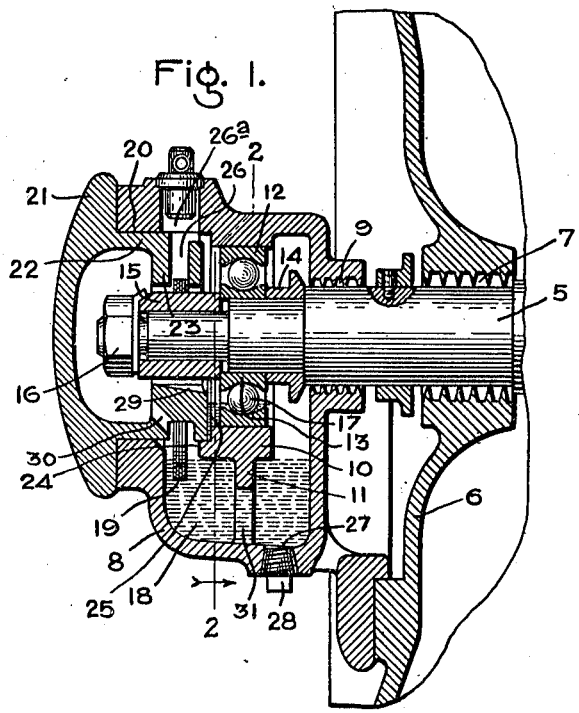
Figure 2:
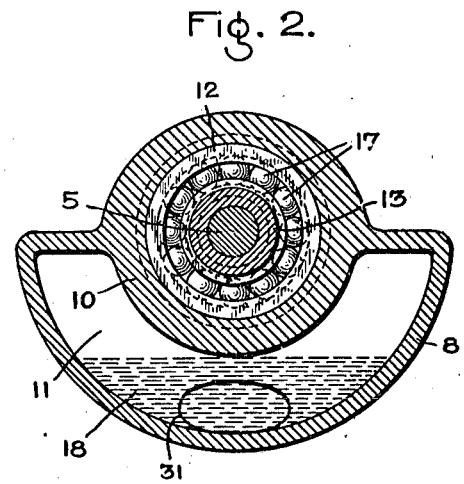

In the accompanying drawing, Figure 1 is a vertical longitudinal sectional view of a bearing embodying my invention, and Fig. 2 is a section taken on line 2—2, Fig. 1.

Referring to the drawing, 5 indicates a shaft, the end of which is to be supported in a bearing, and 6 indicates a portion of a casing having a packing 7 through which the end of the shaft extends. Suitably supported by the casing 6 is a bearing housing 8 in which the end of shaft 5 is located. Surrounding the shaft 5 where it passes into the housing 8 is a packing 9. Inside of the housing 8 is a bearing frame comprising an annular ring 10 supported by a web 11 and carried in ring 10 is the outer race member 12 of a ball bearing, the inner race member 13 being carried by the shaft. The ball bearing is held between the sleeves 14 and 15, the sleeve 15 being locked in position by a nut 16 screwed over the end of the shaft 5 which is reduced in diameter and threaded for this purpose. 17 indicates the balls of the bearing. The lower portion of bearing housing 8 serves as an oil reservoir 18 into which the oil ring or rings 19 dip. In the housing 8 opposite the end of shaft 5 is an opening 20 closed by a cap 21. The cap 21 comprises an annular wall 22 which fits the opening 20 and which is provided with an annular flange 23 which surrounds the sleeve 15. The end surface of flange 23 is spaced slightly from the ball bearing and rests at its lower edge on a ledge 24 on the bearing frame ring 10. This forms a small pocket or chamber 25 for containing lubricant. The flange 23 is formed with an eccentric groove 26 which on its upper side extends entirely through the flange, and in this groove is located the oil ring 19. In the top of the housing 8 is an oil filling opening 26ª and in the bottom of the housing is a drain opening 27 closed by a plug 28. Directly beneath the sleeve 15 in the flange 23 of the bearing cap is a groove 29 which slopes toward the pocket 25. In the flange 23 is an opening 30 which connects the space within the cap 21 to the reservoir 18 and in the web 11 is an opening 31 for the lubricant to flow through.

The oil ring 19, as shown in Fig. 1, rests on the sleeve 15 and as the shaft turns oil is carried by it up onto the sleeve. The greater portion of this oil runs along the sleeve toward the bearing and drips off into the pocket 25 or is thrown off from the sleeve and is led to the pocket by groove 29. The remainder runs toward the end of the shaft and drips off and is returned to the reservoir 18 through opening 30. The oil collected in pocket or chamber 25 can only return to reservoir 18 by passing through the bearing. By this arrangement there is always a supply of oil passing from the pocket 25 through the bearing back to the reservoir 18.

The arrangement of the eccentric groove 26 in the flange 23 is such that when the cap 21 is turned through an angle of 180° from the position shown in Fig. 1, the oil ring 19 will be lifted up out of the oil and brought entirely within the groove 26. The cap 21 and oil ring 19 can then be removed together from the housing 8 without danger of injuring the oil ring. This makes it a very simple matter to remove the oil ring. It will also be noted that the one wall of the lubricant pocket 25 is formed by the flange 23 which carries the oil ring 19. When these parts are removed, therefore, the bearing is immediately accessible for inspection and repair.

It will be understood, of course, that my invention is not limited to ball bearings and also that if found desirable more than one eccentric groove 26 may be provided for carrying oil rings.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In an apparatus of the character described, the combination of a casing having a lubricant reservoir therein, a bearing in the casing, means forming a pocket adjacent and to one side of the bearing from which lubricant is fed to the bearing, and an oil ring which conveys lubricant from the reservoir to said pocket.

2. In an apparatus of the character described, the combination of a shaft, a housing into which the end of the shaft projects, said housing having a lubricant reservoir therein, a bearing in the housing in which the shaft is supported, means forming a pocket adjacent the bearing from which lubricant is fed to the bearing, a member surrounding the end of the shaft and having an eccentric annular groove therein, and an oil ring supported in said groove for conveying lubricant from the reservoir to said pocket, said member being adapted to be turned to bring the oil ring entirely within the confines of said groove.

3. The combination of a shaft, a housing into which the shaft projects, a bearing therein for the shaft, an annular member which slips over the end of the shaft and is removably supported by the housing, said member having an eccentric groove therein which extends entirely through it on one side, and an oil ring in said groove, said member when in one position permitting the oil ring to rest on the shaft and when turned to another position bringing the oil ring entirely within the confines of said groove, so the said member and ring can be removed from the housing by an axial movement.

4. In an apparatus of the character described, the combination of a shaft, a housing into which the shaft projects, said housing having a lubricant reservoir therein and an opening opposite the end of the shaft, a bearing bracket in the housing, a bearing for the shaft supported therein, a member which projects through said opening and surrounds the shaft, said member being spaced from said bracket to form a pocket adjacent the bearing from which lubricant is fed to the bearing, said member being provided with a groove, and an oil ring in said groove which conveys lubricant from the reservoir to said pocket, said member and oil ring being removable as a unit from the housing.

In witness whereof, I have hereunto set my hand this eighth day of August, 1917.

RICHARD H. RICE.